US012379094B1

(12) United States Patent
Krut

(10) Patent No.: US 12,379,094 B1
(45) Date of Patent: Aug. 5, 2025

(54) ADJUSTABLE LIGHT ASSEMBLY

(71) Applicant: The Boeing Company, Arlington, VA (US)

(72) Inventor: Dimitri Daniel Krut, Encino, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/626,010

(22) Filed: Apr. 3, 2024

(51) Int. Cl.
*F21V 14/02* (2006.01)
*F21V 21/30* (2006.01)
*F21V 21/34* (2006.01)

(52) U.S. Cl.
CPC .............. *F21V 14/02* (2013.01); *F21V 21/30* (2013.01); *F21V 21/34* (2013.01)

(58) Field of Classification Search
CPC ................................ F21V 14/02; F21V 21/30
See application file for complete search history.

(56) References Cited

U.S. PATENT DOCUMENTS 6,908,214 B2 * 6/2005 Luk ......................... F21V 19/02 362/240
2009/0237924 A1 * 9/2009 Ladewig ................. F21S 2/005 362/231
2011/0317411 A1 * 12/2011 Lee ....................... F21V 7/0008 362/235
2016/0097518 A1 * 4/2016 Kim ........................ F21V 14/02 362/233

* cited by examiner

*Primary Examiner* — William N Harris
(74) *Attorney, Agent, or Firm* — Alleman Hall & Tuttle LLP

(57) ABSTRACT

According to one aspect of the present disclosure, an adjustable light assembly is disclosed. The adjustable light assembly comprises an enclosure and a plurality of illuminator groupings within the enclosure. Each of the illuminator groupings comprises a plurality of pre-focused light sources and is pivotably coupled to the enclosure. An adjustment mechanism is coupled to each of the illuminator groupings to pivot each of the illuminator groupings relative to the enclosure.

20 Claims, 9 Drawing Sheets

ADJUSTABLE LIGHT ASSEMBLY

FIELD

The present disclosure relates generally to the field of lighting, and more specifically to adjustable light assemblies comprising pre-focused light sources.

BACKGROUND

Pre-focused light sources, such as light-emitting diodes (LED) and lasers, (including secondary phosphor emission white laser devices), produce a single beam. In some examples of these light sources, a moveable collection lens can provide adjustable focusing. However, this configuration is not optically efficient and can be challenging to implement for larger illumination systems. Additionally, these light sources operate optically most efficiently when they are coupled to a specially optimized reflector or a TIR (Totally Internally Reflected) lens element. These lens elements are not adjustable and can operate only in a single-focus arrangement.

SUMMARY

According to one aspect of the present disclosure, an adjustable light assembly is provided. The adjustable light assembly comprises an enclosure and a plurality of illuminator groupings within the enclosure. Each of the illuminator groupings comprises a plurality of pre-focused light sources and is pivotably coupled to the enclosure. An adjustment mechanism is coupled to each of the illuminator structures to pivot each of the illuminator structures relative to the enclosure.

In another aspect, a method of adjusting an optical beam divergence angle produced by an adjustable light assembly is provided. The adjustable light assembly comprises a plurality of illuminator groupings within an enclosure, wherein each of the illuminator groupings comprises a plurality of pre-focused light sources. The method comprises pivoting each of the illuminator groupings relative to the enclosure from a first position associated with a first optical beam divergence angle to a second position associated with a second optical beam divergence angle.

In another aspect, an adjustable light assembly is provided. The adjustable light assembly comprises a cylindrical enclosure and a plurality of illuminator groupings disposed with radial symmetry within the cylindrical enclosure. Each of the illuminator groupings comprises a plurality of pre-focused light sources and is pivotably coupled to the cylindrical enclosure. Additionally, each of the light sources comprises either a light-emitting diode (LED) or a laser. An adjustment mechanism is coupled to each of the illuminator groupings to tilt each of the illuminator structures relative to the cylindrical enclosure.

The features, functions, and advantages that have been discussed can be achieved independently in various embodiments or may be combined in yet other embodiments, further details of which can be seen with reference to the following description and drawings.

DETAILED DESCRIPTION

As noted above, in some examples light sources are provided with adjustable focusing by a moving collection lens. These configurations are not optically efficient and can be challenging to implement for larger illumination systems. In other examples an optimized reflector such as a TIR (Total Internal Reflection) lens element can be utilized. However, the configuration of these structures precludes them from adjusting the beam pattern or beam divergence. For other light sources such as discharge lamps, focus adjustment is accomplished by changing the focal position of a reflector. For examples such as searchlights, this configuration enables operators to adjust the beam spot on a target. However, these light sources are limited in their optical efficiency.

As described in more detail below, configurations of the present disclosure provide light assemblies with adjustable optical beam divergence angles, with the light assemblies including a plurality of illuminator groupings within an enclosure. Each illuminator grouping comprises a plurality of pre-focused light sources. Advantageously, an adjustment mechanism is coupled to each of the illuminator groupings to pivot each of the illuminator groupings relative to the enclosure, thereby enabling adjustment between a wider and a narrower beam focus.

Figure 1:
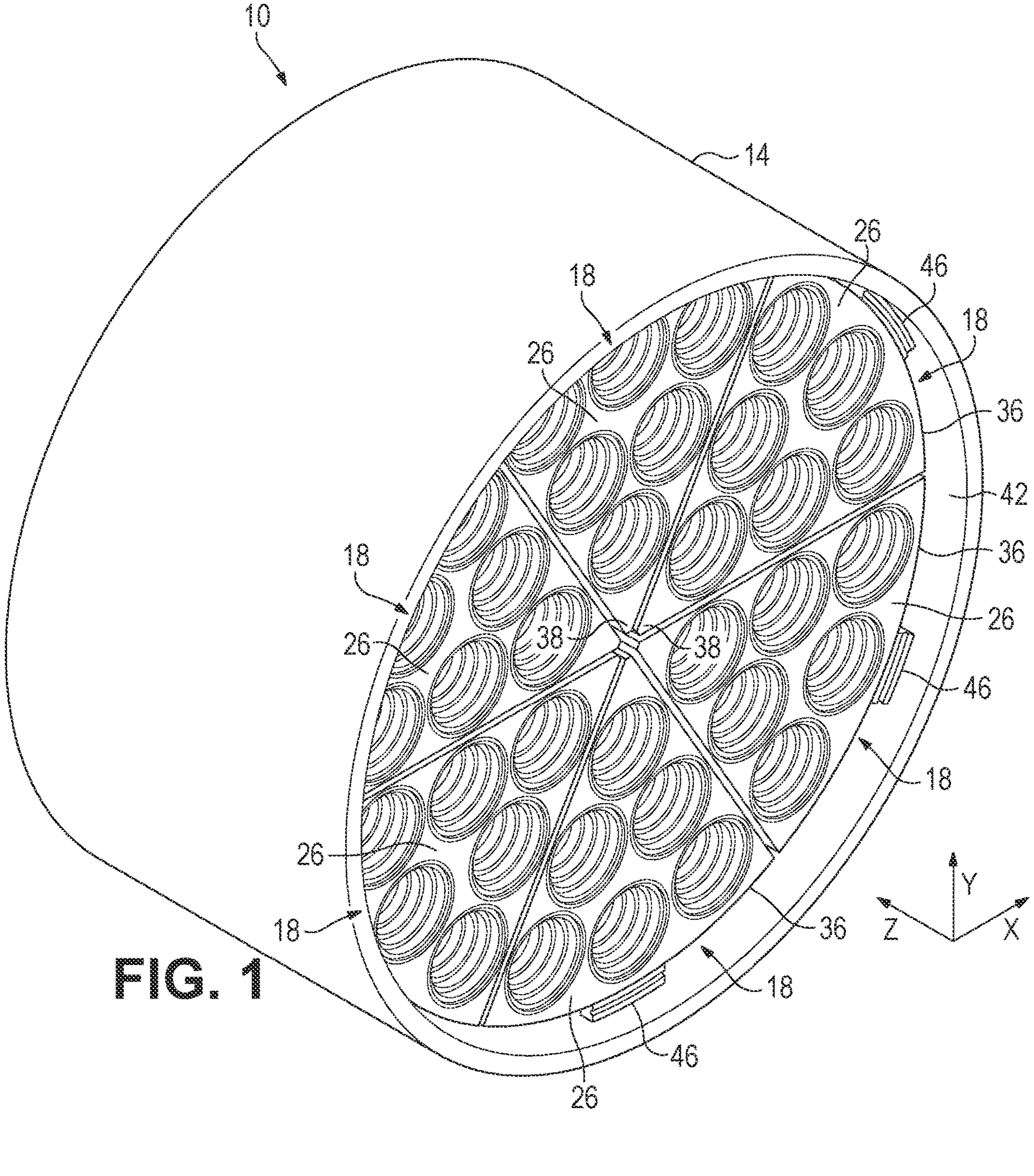
FIG. 1 is a representation of an exemplary light assembly according to an embodiment of the present disclosure.

FIG. 1 is a perspective view an adjustable light assembly 10 according to examples of the present disclosure. In some examples the adjustable light assembly 10 can take the form of a searchlight, spotlight, or other form factor. In other examples, the configurations and components of the present disclosure can be used with a wide variety of other light assemblies having different form factors, sizes, and/or applications. Advantageously and as described in more detail below, the adjustable light assemblies of the present disclosure enable the adjustment of the optical beam divergence angle of a plurality of pre-focused light sources, such as LED or LASER-based illuminators, in a variety of applications, such as searchlights, aircraft landing lights, and theatrical spotlights.

Figure 2:
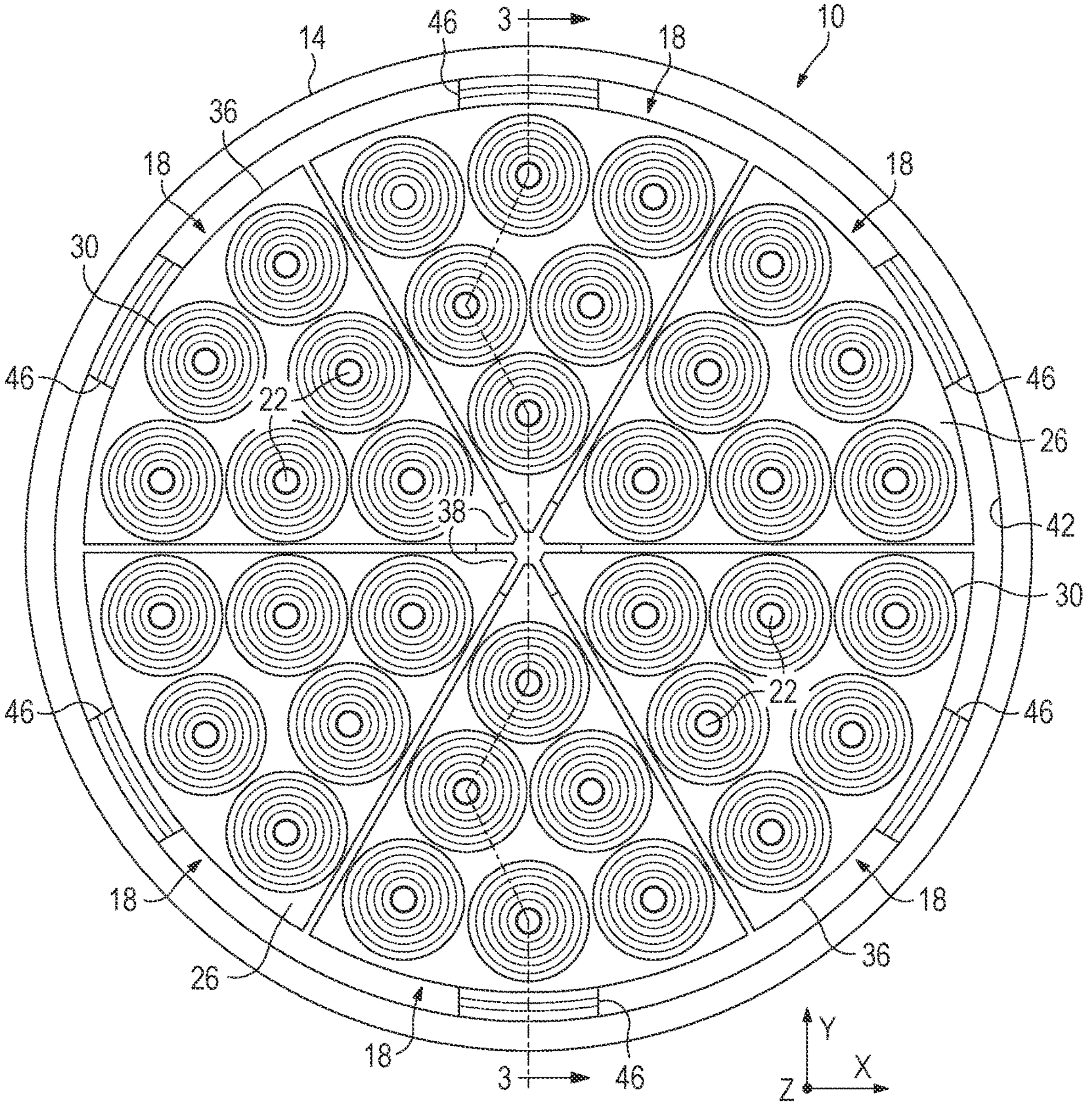
FIG. 2 shows a front view of the light assembly of FIG. 1.

With reference also to FIG. 2, the adjustable light assembly 10 comprises an enclosure that takes the form of a cylinder 14 in the present example. In other examples, the enclosure can be configured in other shapes, such as rectangular, hexagonal, or other configurations. Within the enclosure are located a plurality of illuminator groupings 18, with each of the groupings comprising a plurality of pre-focused light sources 22. In the present example, each of the illuminator groupings comprises a support plate 26 that contains six pre-focused light sources 22. The support plate 26 can be fabricated from aluminum, titanium, or other suitable material. In other examples, illuminator groupings can contain 2, 3, 10 or any other number of pre-focused light sources.

Figure 3:
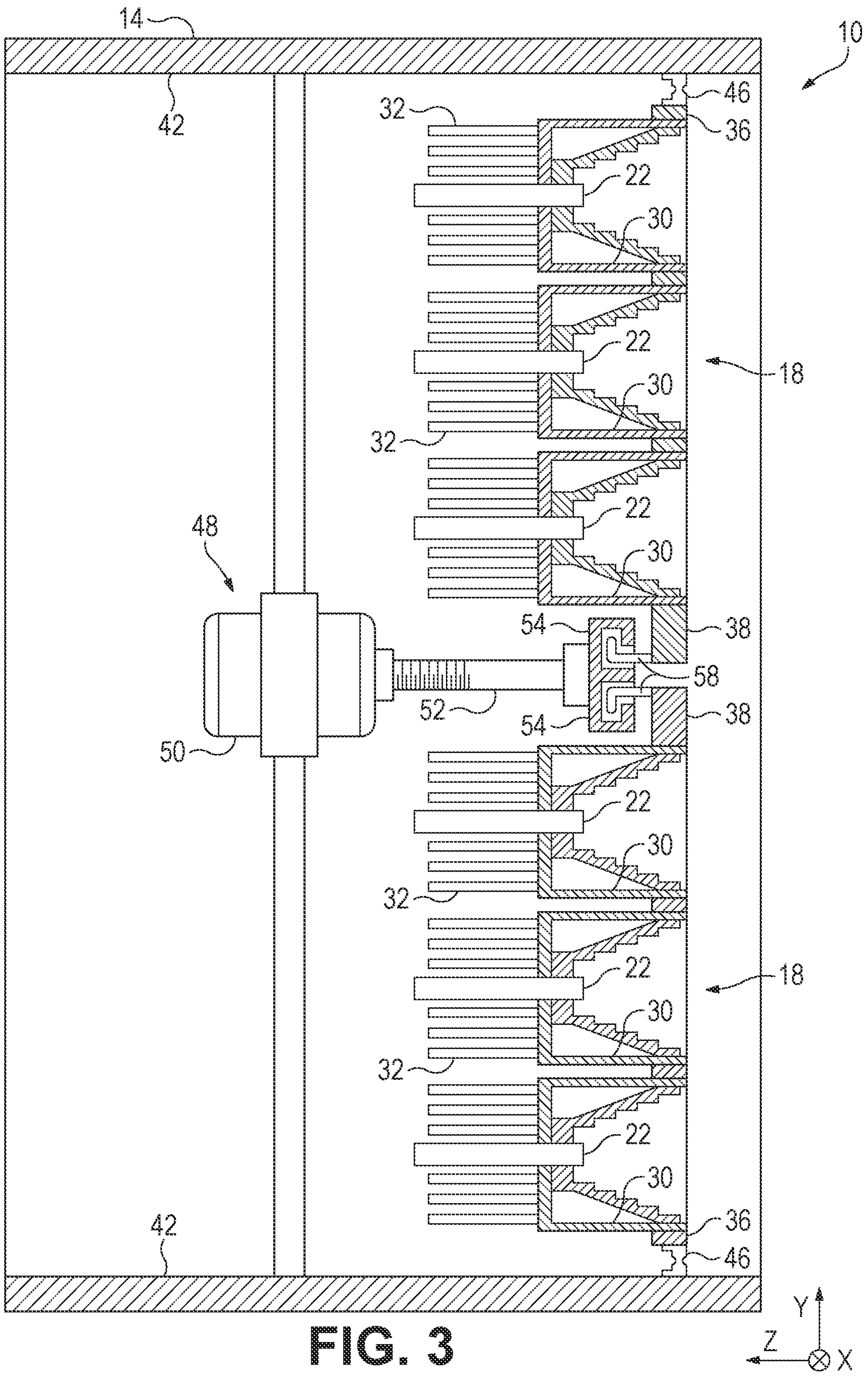
FIG. 3 shows a sectional view of the light assembly of FIG. 1 taken along line 3-3 in FIG. 1.

With reference now to FIG. 3, each light source 22 is located in a housing 30 that is secured to the support plate 26. In this example each housing 30 further includes a plurality of heat sink fins 32 extending from a rear wall of the housing. In this example the pre-focused light sources 22 are light-emitting diode (LED) light sources. In other examples, the pre-focused light sources can be lasers, including but not limited to secondary phosphor emission white laser devices, or other suitable pre-focused light sources.

As shown in FIGS. 1 and 2, each of the illuminator groupings 18 has the same size and the same shape, and each contains six pre-focused light sources. In each of the illuminator groupings 18, the support plate 26 has a generally triangular shape comprising an arcuate proximal end 36 adjacent to the cylindrical enclosure 14 and an opposing distal end 38. In other examples, other shapes and configurations of support plates can be utilized. Further, in one potential advantage and as described further below, the plurality of illuminator groupings are radially symmetrical. In this manner, an adjustment mechanism (described further below) coupled to each of the illuminator groupings 18 can pivot each of the illuminator groupings relative to the enclosure 14 in a manner that symmetrically adjusts the optical beam divergence angle of the light sources between a wider angle and narrower angle.

In some examples, the plurality of illuminator groupings 18 are pivotably coupled to the enclosure 14 at evenly-spaced locations around the enclosure. In the present example, in each illuminator grouping 18 the proximal end 36 of the support plate 26 is pivotably coupled to an interior surface 42 of the enclosure 14. As shown in FIGS. 1-3, in this example a flexure 46 pivotably couples the proximal end 36 to the interior surface 42 of the enclosure 14. In different examples the flexure 46 can be fabricated from steel, bronze, or other material having a degree of flexibility. In other examples the flexure 46 can take the form of a hinge.

Figure 4:
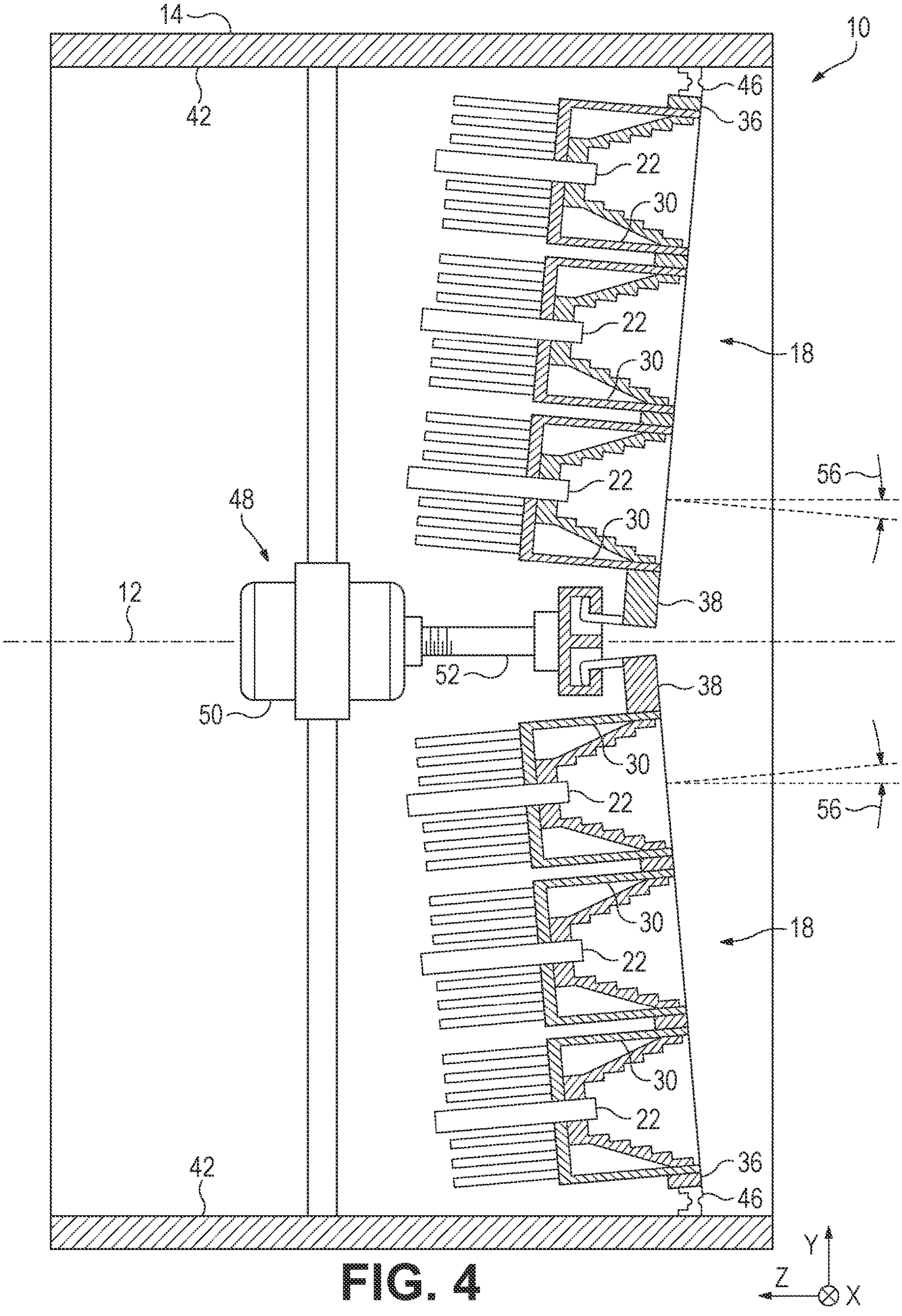
FIG. 4 shows the light assembly of FIG. 3 in a narrow-beam position.
Figure 5:
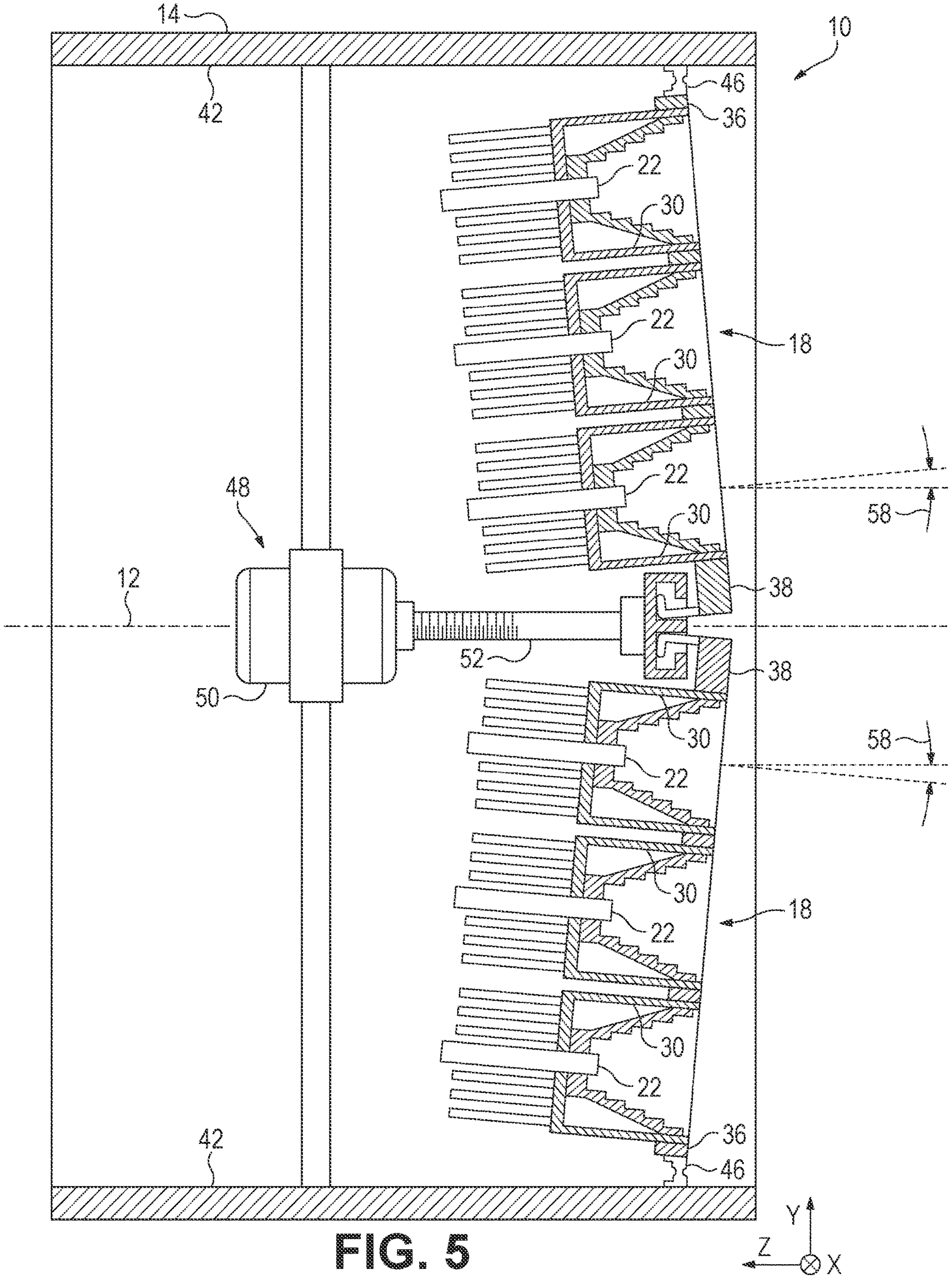
FIG. 5 shows the light assembly of FIG. 3 in a wide-beam position.

With reference to FIGS. 3-5, in this example the adjustment mechanism comprises a single actuator 48 that engages each of the illuminator groupings 18 at the distal end 38 of each support plate 26. In this example, the actuator 48 comprises a servo motor 50 and a lead screw 52 with a capture element 54 at a distal end of the lead screw. The capture element 54 is coupled to an extension 58 of each support plate 26, where each extension extends in the z-axis direction from the distal end 38 of each support plate. In other examples, a variety of other configurations of capture elements that engage with the distal end 38 of each support plate 26 can be utilized.

With reference to FIG. 3, in this nominal position the pre-focused light sources 22 in each of the illuminator groupings 18 are associated with a first optical beam divergence angle of the light generated by each of the light sources. As illustrated in FIGS. 3-5, the servo motor 50 is actuated to advance and retract the lead screw 52 along the z-axis. As shown in FIG. 4, when the servo motor retracts the lead screw 52 each illuminator grouping 18 pivots about its flexure 46 to move the distal end 38 of its support plate 26 inwardly in the z-axis direction and thereby direct the beams from each pre-focused light source 22 toward the central axis 12 of the light assembly 10. Accordingly, and in one potential advantage of the present disclosure, this configuration allows each of the illuminator groupings 18 to be pivoted relative to the enclosure from a first position associated with a first optical beam divergence angle to a second position associated with a second, narrower optical beam divergence angle.

In one example, with respect to the illuminator groupings 18 configured in the nominal position as shown in FIG. 3, an initial optical beam divergence angle of this configuration, such as 10-12 degrees divergence, can be narrowed to a narrower optical beam divergence angle of 4-6 degrees divergence by moving the illuminator groupings to the configuration shown in FIG. 4. In this example, each of the illuminator groupings 18 is pivoted by an angle 56 of 2-3 degrees.

In a similar manner and with reference to FIG. 5, when the servo motor extends the lead screw 52 in the negative z-axis direction, each illuminator grouping 18 pivots about its flexure 46 to move the distal ends 38 of each support plate 26 outwardly in the negative z-axis direction and thereby direct the beams from each pre-focused light source 22 away the central axis 12 of the light assembly 10. Again with respect to the illuminator groupings 18 configured in the nominal position as shown in FIG. 3, an initial optical beam divergence angle of this configuration, such as 10-12 degrees divergence, can be widened to a wider optical beam divergence angle of 16-18 degrees divergence by moving the illuminator groupings to the configuration shown in FIG. 4. In this example, each of the illuminator groupings 18 are pivoted by an angle 58 of 2-3 degrees.

Figure 6:
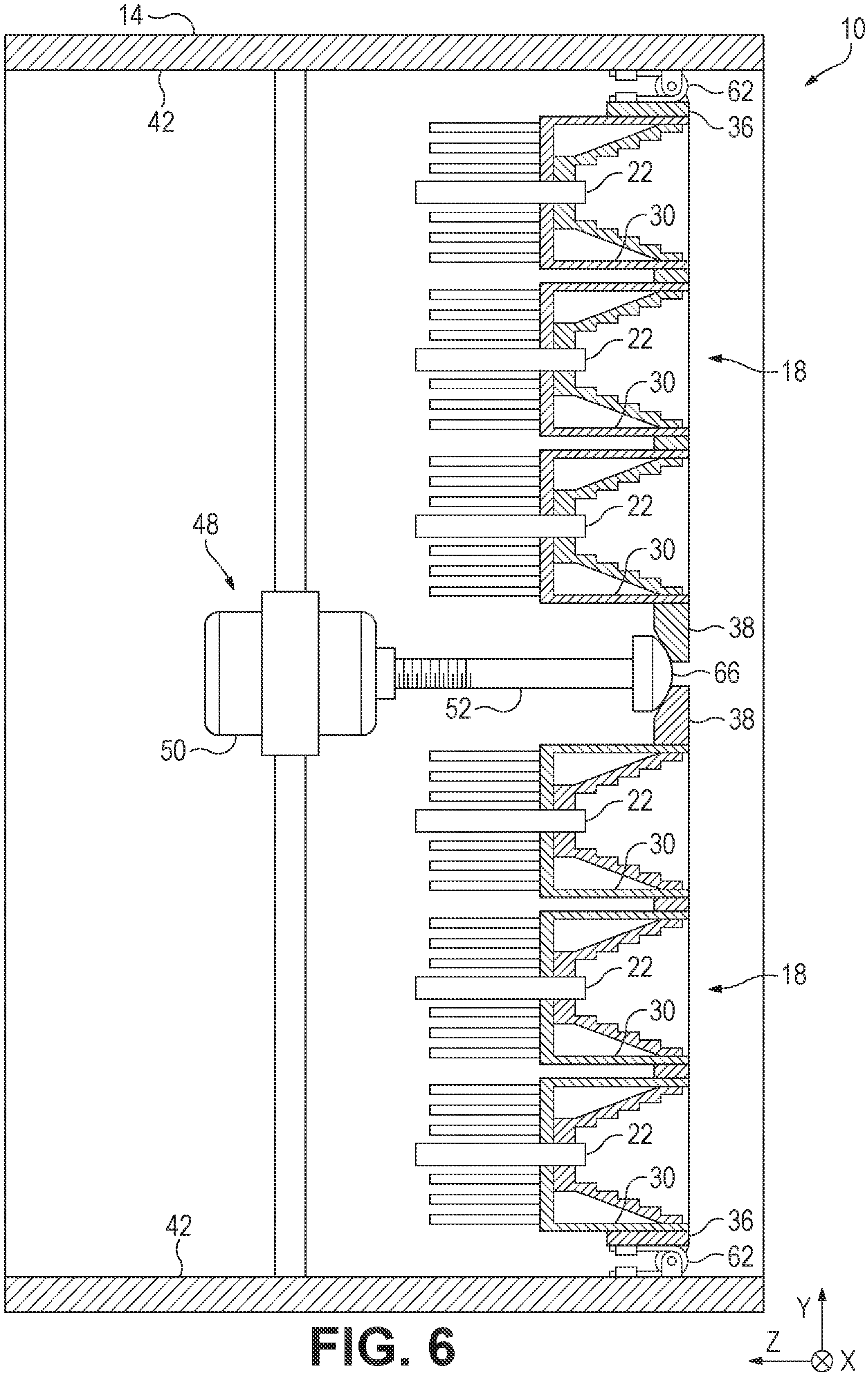
FIG. 6 shows a sectional view of an exemplary light assembly according to another embodiment of the present disclosure.

In other configurations each support plate 26 can be pivotably coupled to the enclosure 14 using component(s) that actively bias the support plates for pivoting movement. With reference now to FIG. 6, in this example configuration the proximal end 36 of each support plate 26 in each of the illuminator groupings 18 is pivotably coupled to the interior surface 42 of the enclosure 14 via a spring-loaded hinge 62. In different examples the spring-loaded hinge 62 can take the form of a leaf spring, helical spring, elastomeric member, or any other suitable hinge or resilient member.

In this example, each spring-loaded hinge 62 is biased to pivot each illuminator grouping 18 inwardly such that the distal end 38 of each support plate 26 is biased to move in the z-axis direction toward servo motor 50. Additionally, a bearing surface 66 at the distal end of lead screw 52 engages the distal end 38 of the support plate 26 of each illuminator group 18. In this manner, as the lead screw is advanced or retracted along the z-axis by the servo motor 50, the distal ends 38 of each support plate 26 are pushed outwardly or retracted inwardly against the bearing surface 66 to correspondingly pivot each illuminator grouping 18 about its corresponding spring-loaded hinge 62. Accordingly, in this example the distal ends 38 of each support plate 26 are moved inwardly and outwardly in the z-axis direction as described above to thereby direct the beams from each pre-focused light source 22 toward and away from the central axis 12 of the light assembly 10. In this manner, this configuration also allows each of the illuminator groupings 18 to be symmetrically pivoted relative to the enclosure to adjust the optical beam divergence angle between wider and narrower angles.

Figure 7:
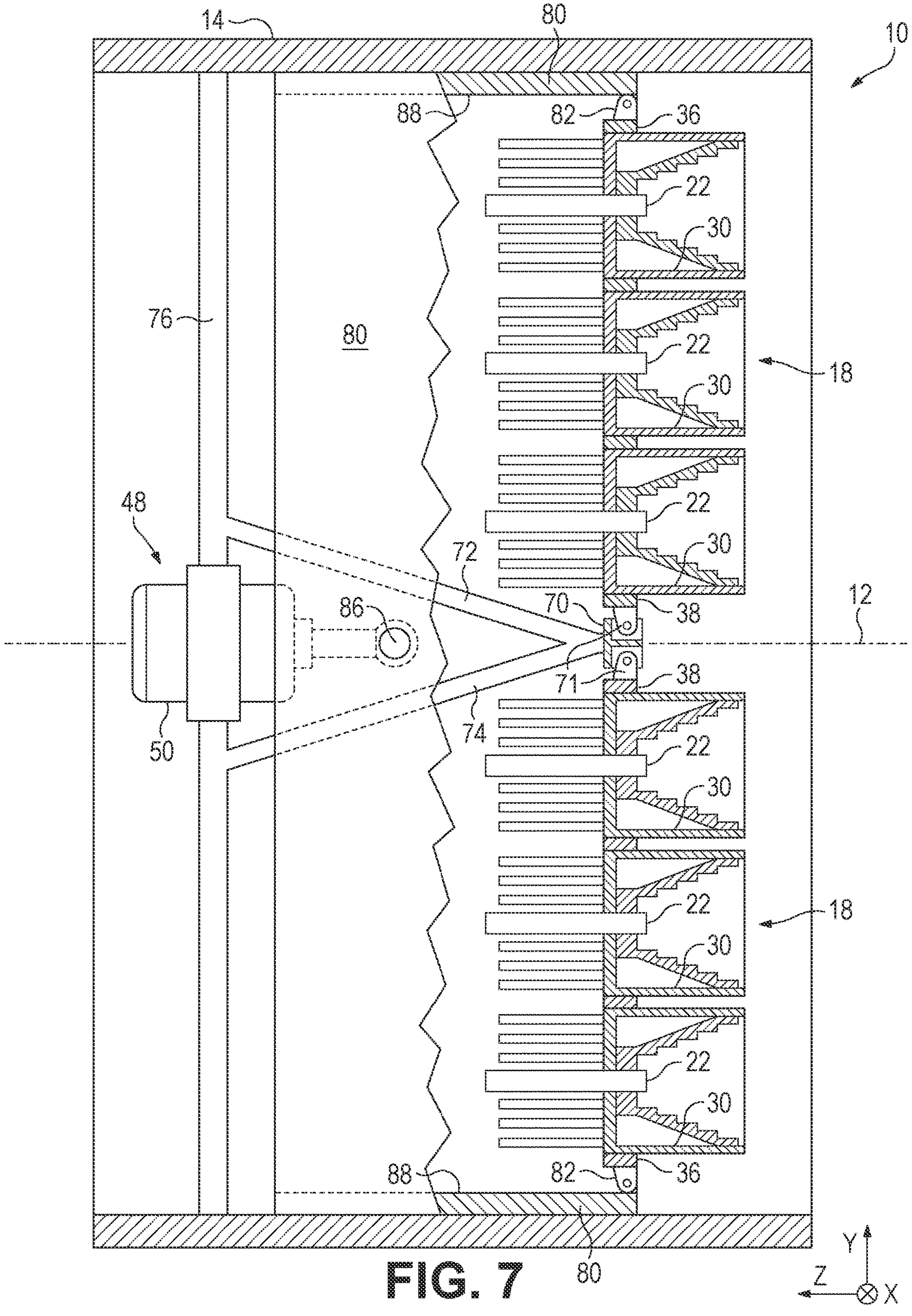
FIG. 7 shows a sectional view of an exemplary light assembly according to another embodiment of the present disclosure.
Figure 8:
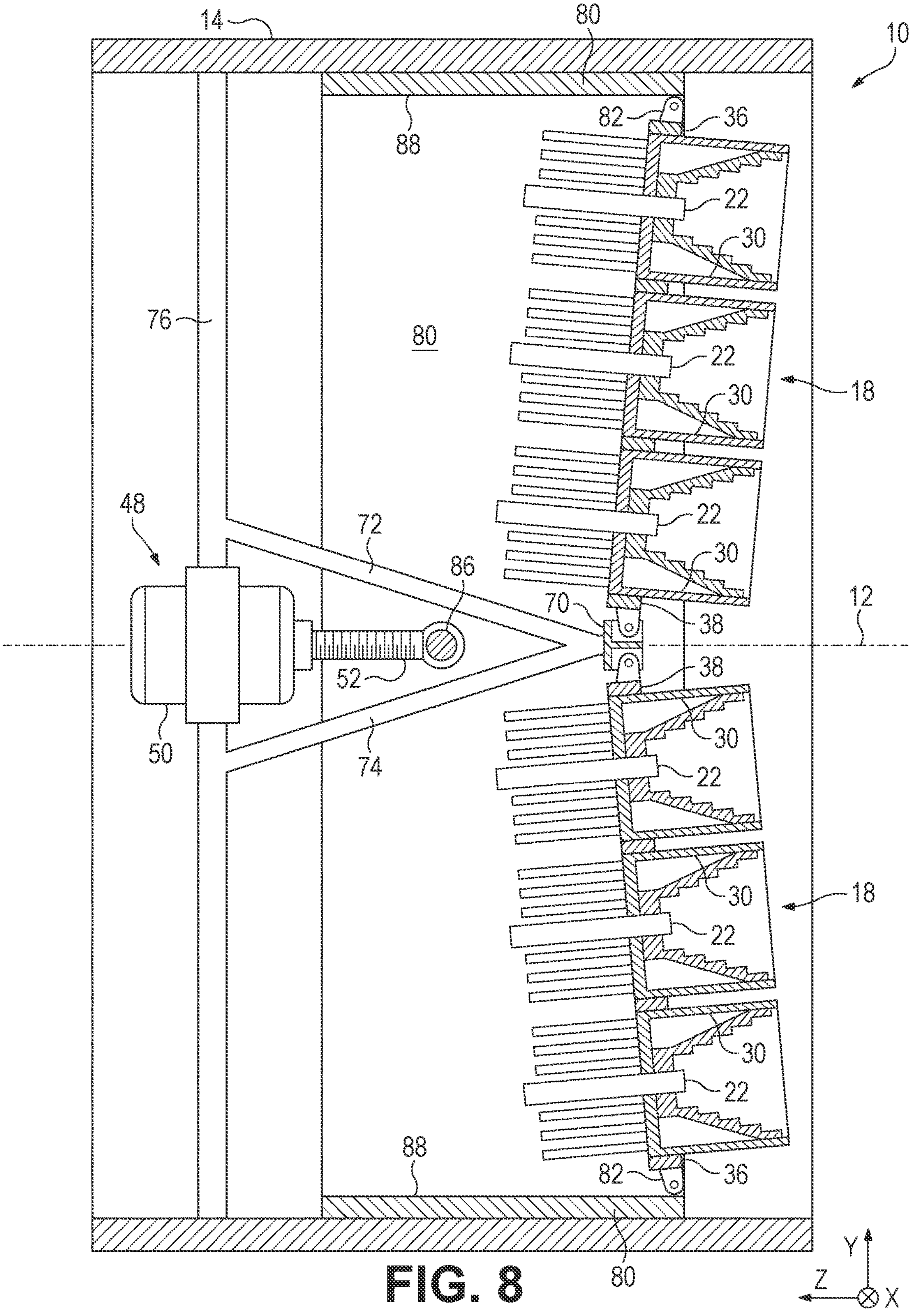
FIG. 8 shows the light assembly of FIG. 7 in a narrow-beam position.

With reference now to the example shown in FIGS. 7 and 8, in this configuration the distal end 38 of each support plate 26 in each of the illuminator groupings 18 is pivotably coupled to a central anchor 70 within the enclosure 14 via a hinge 71. The central anchor 70 is fixed relative to the enclosure 14 via a support structure comprising a first support arm 72 and second support arm 74 that couple the anchor to a transverse member 76 that spans between opposing sides of the interior surface 42 of the enclosure.

In this example, the adjustment mechanism comprises an actuator assembly that is moveably coupled to the proximal end 36 of each of the illuminator groupings 18. More particularly, the proximal end 36 of each support plate 26 is pivotably coupled to a second, moveable cylinder 80 inside the enclosure 14 at a hinge 82. The moveable cylinder 80 is translated relative to the enclosure 14 along the z-axis via servo motor 50 and lead screw 52. More particularly, in this example at the distal end of lead screw 52 a connecting rod 86 extends between and is secured to the inner surface 88 of the moveable cylinder 80. In this manner, retraction and extension of lead screw 52 similarly retracts and extends the moveable cylinder 80. In this manner and as the moveable cylinder 80 translates relative to the enclosure 14, each support plate 26 is pivoted about its hinge 82 to change the optical beam divergence angle of the pre-focused light sources 22.

For example and with reference to FIG. 8, when lead screw 52 is advanced in the negative z-axis direction from its position in FIG. 7, the moveable cylinder 80 is similarly translated in the negative z-axis direction. As the central anchor 70 pivot point for each support plate 26 is fixed relative to the enclosure 14, the proximal end 36 of each support plate 26 also translates in the negative z-axis direction and pivots about its hinge 82, thereby pivoting each illuminator grouping 18 inwardly toward the central axis 12 to direct the beams from each pre-focused light source 22 toward the central axis of the light assembly 10.

In a similar manner, when lead screw 52 is retracted in the positive z-axis direction, the moveable cylinder 80 is similarly translated in the positive z-axis direction and the proximal end 36 of each support plate 26 also translates in the positive z-axis direction and pivots about its hinge 82. Each illuminator grouping 18 is correspondingly pivoted outwardly away from the central axis 12 to direct the beams from each pre-focused light source 22 away from the central axis of the light assembly 10. In this manner, this configuration also allows each of the illuminator groupings 18 to be symmetrically pivoted relative to the enclosure to adjust the optical beam divergence angle between wider and narrower angles.

Like the other configurations described herein, in the configuration of FIGS. 7 and 8 the plurality of illuminator groupings 18 are pivotably coupled to the moveable cylinder 80 of the actuator assembly at evenly-spaced locations around the cylinder. Similarly, in this configuration the plurality of illuminator groupings 18 are radially symmetrical. Further and like the other configurations, each of the illuminator groupings 18 has the same size, same shape, and contains the same number of the pre-focused light sources 22.

In other examples, a variety of other configurations of adjustment mechanisms, actuator assemblies, and related components can be utilized to engage with the proximal end 36 and/or distal end 38 of each support plate 26 to pivot each of the illuminator groupings relative to the enclosure.

Figure 9:
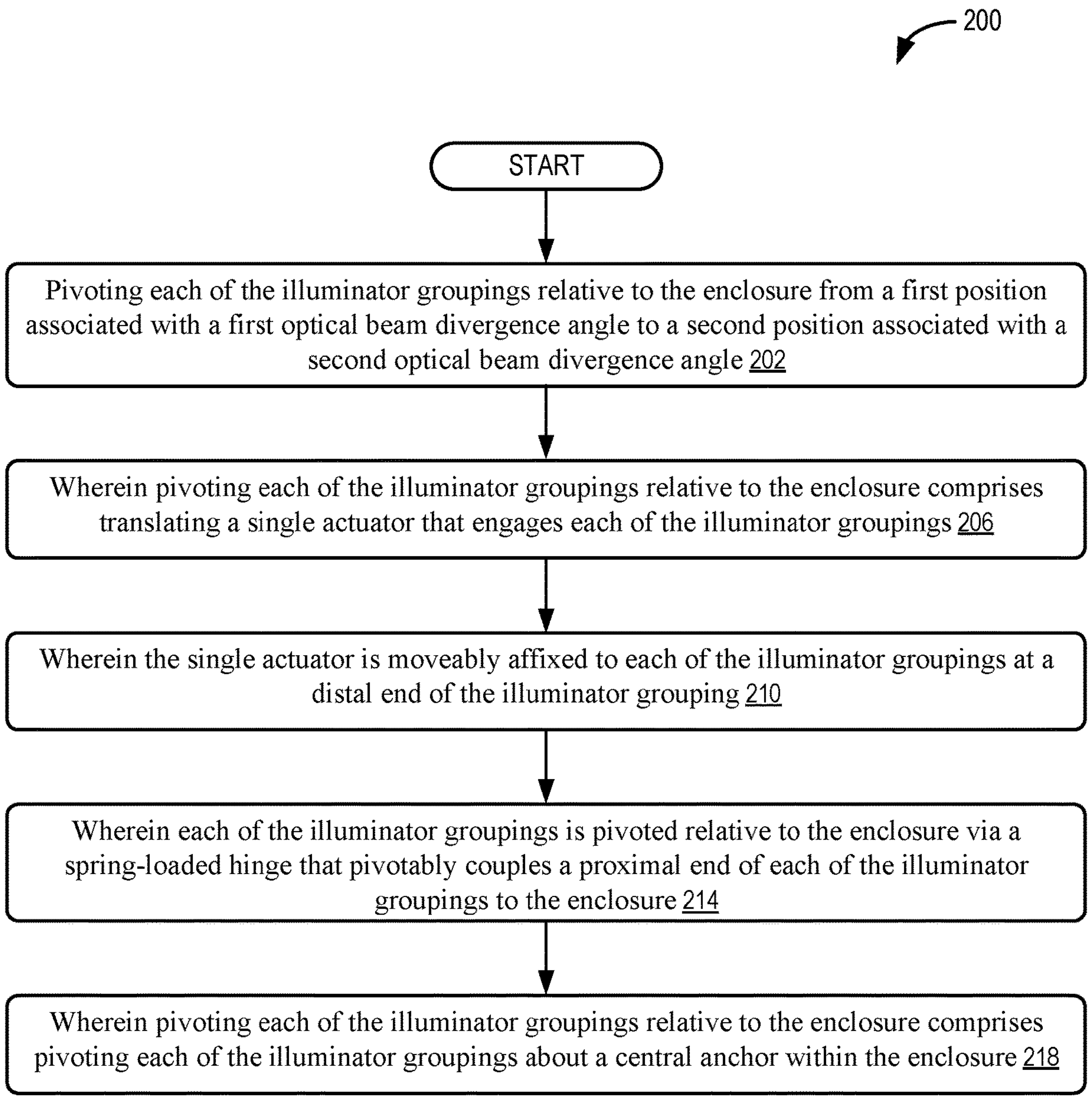
FIG. 9 is a flowchart of an exemplary embodiment of a method of adjusting an optical beam divergence angle produced by an adjustable light assembly according to examples of the present disclosure.

FIG. 9 is a flowchart of an example method 200 of adjusting an optical beam divergence angle produced by an adjustable light assembly. The following description of method 200 is provided with reference to the components described herein and shown in FIGS. 1-8. In other examples, method 200 is performed in other contexts using other suitable components.

At 202 method 200 includes, wherein the adjustable light assembly comprises a plurality of illuminator groupings within an enclosure, wherein each of the illuminator groupings comprises a plurality of pre-focused light sources, pivoting each of the illuminator groupings relative to the enclosure from a first position associated with a first optical beam divergence angle to a second position associated with a second optical beam divergence angle. At 206 method 200 includes wherein pivoting each of the illuminator groupings relative to the enclosure comprises translating a single actuator that engages each of the illuminator groupings. At 210 method 200 includes wherein the single actuator is moveably affixed to each of the illuminator groupings at a distal end of the illuminator grouping. At 214 method 200 includes wherein each of the illuminator groupings is pivoted relative to the enclosure via a spring-loaded hinge that pivotably couples a proximal end of the structure to the enclosure. At 218 method 200 includes wherein pivoting each of the illuminator groupings relative to the enclosure comprises pivoting each of the illuminator groupings about a central anchor within the enclosure.

The concepts described herein are broadly applicable to any suitable light assembly, including searchlights, spotlights and other configurations of pre-focused light sources.

The present disclosure includes all novel and non-obvious combinations and sub-combinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

Further, the disclosure comprises configurations according to the following examples.

Example 1. An adjustable light assembly, comprising: an enclosure; a plurality of illuminator groupings within the enclosure, wherein each of the illuminator groupings comprises a plurality of pre-focused light sources and is pivotably coupled to the enclosure; and an adjustment mechanism coupled to each of the illuminator groupings to pivot each of the illuminator groupings relative to the enclosure.

Example 2. The adjustable light assembly of example 1, wherein the adjustment mechanism comprises a single actuator that engages each of the illuminator groupings.

Example 3. The adjustable light assembly of example 2, wherein each of the illuminator groupings comprises: a proximal end that is pivotably coupled to an interior surface of the enclosure; and a distal end spaced from the proximal end, wherein the single actuator is coupled to the distal end of each of the illuminator groupings.

Example 4. The adjustable light assembly of example 2, wherein each of the illuminator groupings comprises: a proximal end that is pivotably coupled to the enclosure via a spring-loaded hinge; and a distal end spaced from the proximal end, wherein the single actuator engages the distal end of each of the illuminator groupings.

Example 5. The adjustable light assembly of example 1, wherein the plurality of illuminator groupings are pivotably coupled to the enclosure at evenly-spaced locations around the enclosure.

Example 6. The adjustable light assembly of example 1, wherein the plurality of illuminator groupings are radially symmetrical.

Example 7. The adjustable light assembly of example 1, wherein each of the illuminator groupings has a same size, a same shape, and contains a same number of the pre-focused light sources.

Example 8. The adjustable light assembly of example 1, wherein each of the pre-focused light sources comprises a light-emitting diode (LED) or a laser.

Example 9. The adjustable light assembly of example 1, wherein the enclosure is a cylinder.

Example 10. The adjustable light assembly of example 1, wherein each of the illuminator groupings comprises: a distal end that is pivotably coupled to a central anchor within the enclosure; and a proximal end that is spaced from the distal end, wherein the adjustment mechanism comprises an actuator assembly that is moveably affixed to the proximal end of each of the illuminator groupings.

Example 11. The adjustable light assembly of example 10, wherein the actuator assembly comprises a cylinder that is moveably coupled to the proximal end of each of the illuminator groupings.

Example 12. The adjustable light assembly of example 10, wherein the plurality of illuminator groupings are pivotably coupled to the actuator assembly at evenly-spaced locations around the actuator assembly.

Example 13. The adjustable light assembly of example 10, wherein the plurality of illuminator groupings are radially symmetrical.

Example 14. The adjustable light assembly of example 10, wherein each of the illuminator groupings has a same size, a same shape, and contains a same number of the pre-focused light sources.

Example 15. A method of adjusting an optical beam divergence angle produced by an adjustable light assembly, the method comprising: wherein the adjustable light assembly comprises a plurality of illuminator groupings within an enclosure, wherein each of the illuminator groupings comprises a plurality of pre-focused light sources, pivoting each of the illuminator groupings relative to the enclosure from a first position associated with a first optical beam divergence angle to a second position associated with a second optical beam divergence angle.

Example 16. The method of example 15, wherein pivoting each of the illuminator groupings relative to the enclosure comprises translating a single actuator that engages each of the illuminator groupings.

Example 17. The method of example 16, wherein the single actuator is moveably affixed to each of the illuminator groupings at a distal end of the illuminator grouping.

Example 18. The method of example 15, wherein each of the illuminator groupings is pivoted relative to the enclosure via a spring-loaded hinge that pivotably couples a proximal end of each of the illuminator groupings to the enclosure.

Example 19. The method of example 15, wherein pivoting each of the illuminator groupings relative to the enclosure comprises pivoting each of the illuminator groupings about a central anchor within the enclosure.

Example 20. An adjustable light assembly, comprising: a cylindrical enclosure; a plurality of illuminator groupings disposed with radial symmetry within the cylindrical enclosure, wherein each of the illuminator groupings comprises a plurality of pre-focused light sources and is pivotably coupled to the cylindrical enclosure, wherein each of the light sources comprises a light-emitting diode (LED) or a laser; and an adjustment mechanism coupled to each of the illuminator groupings to pivot each of the illuminator groupings relative to the cylindrical enclosure.

"And/or" as used herein means any or all of multiple stated possibilities. For example, the phrase "element A and/or element B" covers embodiments having element A alone, element B alone, or elements A and B taken together.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An adjustable light assembly, comprising:
- an enclosure;
- a plurality of illuminator groupings within the enclosure, wherein each of the illuminator groupings comprises:
  - a plurality of pre-focused light sources;
  - a distal end that is pivotably coupled to a central anchor within the enclosure; and
  - a proximal end that is spaced from the distal end, and
- an adjustment mechanism coupled to each of the illuminator groupings to pivot each of the illuminator groupings relative to the enclosure, wherein the adjustment mechanism comprises a cylinder that is translatable relative to the enclosure and pivotably coupled to the proximal end of each of the illuminator groupings.

2. The adjustable light assembly of claim 1, wherein the adjustment mechanism comprises a single actuator that engages each of the illuminator groupings.

3. The adjustable light assembly of claim 1, wherein the plurality of illuminator groupings are pivotably coupled to the cylinder at evenly-spaced locations around the cylinder.

4. The adjustable light assembly of claim 1, wherein the plurality of illuminator groupings are radially symmetrical.

5. The adjustable light assembly of claim 1, wherein each of the illuminator groupings has a same size, a same shape, and contains a same number of the pre-focused light sources.

6. The adjustable light assembly of claim 1, wherein each of the pre-focused light sources comprises a light-emitting diode (LED) or a laser.

7. The adjustable light assembly of claim 1, wherein the enclosure is a cylinder.

8. A method of adjusting an optical beam divergence angle produced by an adjustable light assembly, the method comprising:
- wherein the adjustable light assembly comprises a plurality of illuminator groupings within an enclosure, wherein each of the illuminator groupings comprises a plurality of pre-focused light sources, a distal end that is pivotably coupled to a central anchor within the enclosure, and a proximal end that is moveably coupled to a cylinder, pivoting each of the illuminator groupings by translating the cylinder relative to the enclosure from a first position associated with a first optical beam divergence angle to a second position associated with a second optical beam divergence angle.

9. The method of claim 8, wherein pivoting each of the illuminator groupings relative to the enclosure comprises translating a single actuator that engages each of the illuminator groupings.

10. The method of claim 9, wherein the single actuator is affixed to the cylinder.

11. The method of claim 8, wherein pivoting each of the illuminator groupings relative to the enclosure comprises pivoting each of the illuminator groupings about the central anchor within the enclosure.

12. An adjustable light assembly, comprising:

a cylindrical enclosure;

a plurality of illuminator groupings disposed with radial symmetry within the cylindrical enclosure, wherein each of the illuminator groupings comprises:

a plurality of pre-focused light sources;

a distal end that is pivotably coupled to a central anchor within the cylindrical enclosure; and a proximal end that is spaced from the distal end, wherein each of the light sources comprises a light-emitting diode (LED) or a laser; and an adjustment mechanism coupled to each of the illuminator groupings to pivot each of the illuminator groupings relative to the cylindrical enclosure, wherein the adjustment mechanism comprises a cylinder that is translatable relative to the cylindrical enclosure and pivotably coupled to the proximal end of each of the illuminator groupings.

13. The adjustable light assembly of claim 1, wherein the adjustment mechanism is configured to pivot each of the illuminator groupings about the central anchor within the enclosure.

14. The adjustable light assembly of claim 2, wherein the actuator comprises a connecting rod that extends between an inner surface of the cylinder.

15. The method of claim 10, wherein the single actuator comprises a connecting rod that extends between an inner surface of the cylinder.

16. The method of claim 8, wherein pivoting each of the illuminator groupings relative to the enclosure further comprises pivoting the proximal end of each of the illuminator groupings relative to the cylinder.

17. The adjustable light assembly of claim 12, wherein the adjustment mechanism comprises a single actuator that engages each of the illuminator groupings.

18. The adjustable light assembly of claim 12, wherein the plurality of illuminator groupings are pivotably coupled to the enclosure cylinder at evenly-spaced locations around the cylinder.

19. The adjustable light assembly of claim 12, wherein the plurality of illuminator groupings are radially symmetrical.

20. The adjustable light assembly of claim 12, wherein each of the illuminator groupings has a same size, a same shape, and contains a same number of the pre-focused light sources.

* * * * *